(12) United States Patent
Suring et al.

(10) Patent No.: US 7,900,584 B2
(45) Date of Patent: Mar. 8, 2011

(54) ANIMAL ENTERTAINMENT DEVICE

(75) Inventors: Stanley L. Suring, Cedarburg, WI (US);
Jonathan D. Supanich, Cedarburg, WI (US); Betsy M. Lipscomb, Cedarburg, WI (US); John M. Lipscomb, Cedarburg, WI (US); Timothy B. Strandell, Racine, WI (US); Daniel J. Delay, Waterford, WI (US)

(73) Assignee: G.H.L. International, Inc., Cedarburg, WI (US)

( * ) Notice: Subject to any disclaimer, the term of this patent is extended or adjusted under 35 U.S.C. 154(b) by 0 days.

(21) Appl. No.: 11/765,661

(22) Filed: Jun. 20, 2007

(65) Prior Publication Data
US 2007/0295284 A1    Dec. 27, 2007

Related U.S. Application Data

(60) Provisional application No. 60/805,219, filed on Jun. 20, 2006.

(51) Int. Cl.
*A01K 29/00* (2006.01)
(52) U.S. Cl. .................. 119/708; 119/707; 119/702
(58) Field of Classification Search .................. 119/702, 119/706, 707, 708; 446/396; D21/399; D11/131, D11/141
See application file for complete search history.

(56) References Cited

U.S. PATENT DOCUMENTS

| 2,096,078 | A |   | 10/1937 | Windson |
| 2,833,244 | A |   | 5/1958 | Bohlman |
| 3,494,037 | A | * | 2/1970 | Arber .......................... 33/27.11 |
| 3,738,055 | A | * | 6/1973 | Marble ........................ 446/341 |
| 3,883,465 | A | * | 5/1975 | Olstowski ..................... 524/773 |
| 4,250,659 | A | * | 2/1981 | Ishiguro ....................... 446/133 |
| 4,422,530 | A | * | 12/1983 | Denton ......................... 185/29 |
| 4,576,116 | A | * | 3/1986 | Binkert ........................ 119/498 |
| 5,052,970 | A | * | 10/1991 | Balwigaire ................... 446/351 |
| 5,377,433 | A | * | 1/1995 | Hazlehurst .................... 40/411 |
| 5,382,186 | A | * | 1/1995 | West ............................ 446/372 |
| D371,641 | S | * | 7/1996 | Crowley ..................... D30/108 |
| 5,595,141 | A | * | 1/1997 | Udelle et al. ................. 119/706 |
| 5,875,736 | A | * | 3/1999 | Udelle et al. ................. 119/706 |
| 5,881,679 | A | * | 3/1999 | Hann ........................... 119/708 |
| 6,378,463 | B1 | * | 4/2002 | Simmons ..................... 119/707 |
| 6,378,464 | B1 |   | 4/2002 | Ritchey |
| 6,736,088 | B1 | * | 5/2004 | McGregor et al. ............ 119/708 |
| 2002/0017249 | A1 |   | 2/2002 | Ritchey |
| 2002/0185083 | A1 |   | 12/2002 | Ritchey |
| 2004/0011299 | A1 | * | 1/2004 | Lamson-Scribner ......... 119/708 |
| 2004/0107918 | A1 | * | 6/2004 | Cox .............................. 119/708 |
| 2005/0268860 | A1 | * | 12/2005 | Ritchey ........................ 119/706 |

* cited by examiner

*Primary Examiner* — Kimberly S Smith
(74) *Attorney, Agent, or Firm* — Boyle Fredrickson, S.C.

(57) ABSTRACT

An animal toy having pendulum action is disclosed. The toy includes a movable pendulum swingably secured within a housing. The pendulum is capable of carrying toys, and each toy is accessible through one or more access openings in the housing.

31 Claims, 6 Drawing Sheets

ANIMAL ENTERTAINMENT DEVICE

CROSS-REFERENCE TO RELATED APPLICATION

This application claims priority under 35 U.S.C. §119(e) to U.S. Provisional Application Ser. No. 60/805,219, filed Jun. 20, 2006 and entitled "Animal Entertainment Device", the contents of which is hereby incorporated by reference in its entirety.

FIELD OF THE INVENTION

The present invention is directed to an animal toy, and, more particularly, to a cat toy with a moveable pendulum shaft secured within a housing and capable of carrying multiple toys attachable to the moveable pendulum shaft such that each toy is accessible through access openings in the housing.

BRIEF DESCRIPTION OF THE DRAWINGS

Preferred exemplary embodiments of the invention are illustrated in the accompanying drawings in which like reference numerals represent like parts throughout and in which.

Figure 1:
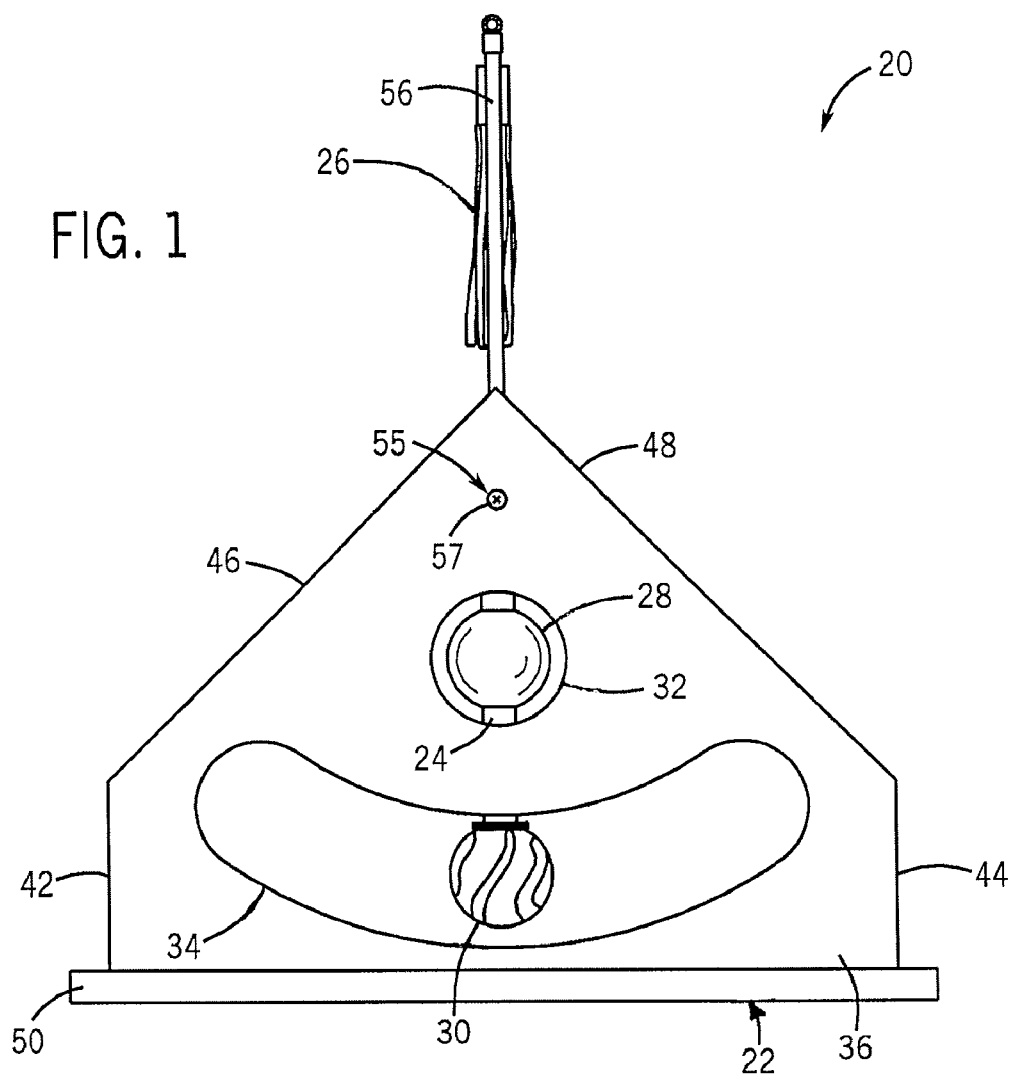
FIG. 1 is a drawing of a cat toy constructed in accordance with a first preferred embodiment of the invention.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 2A:
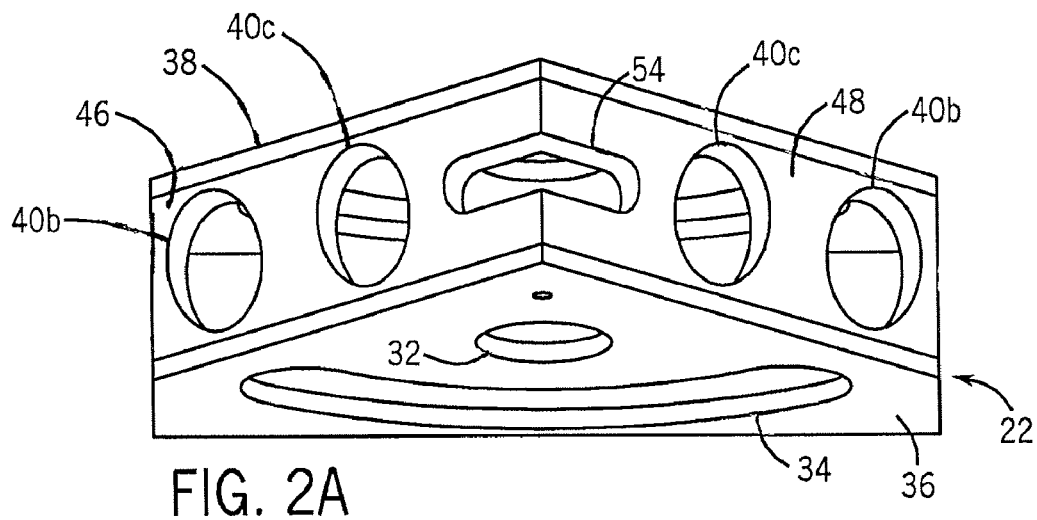
FIG. 2A is a drawing illustrating a top view of the housing of the cat toy of FIG. 1.
Figure 2B:
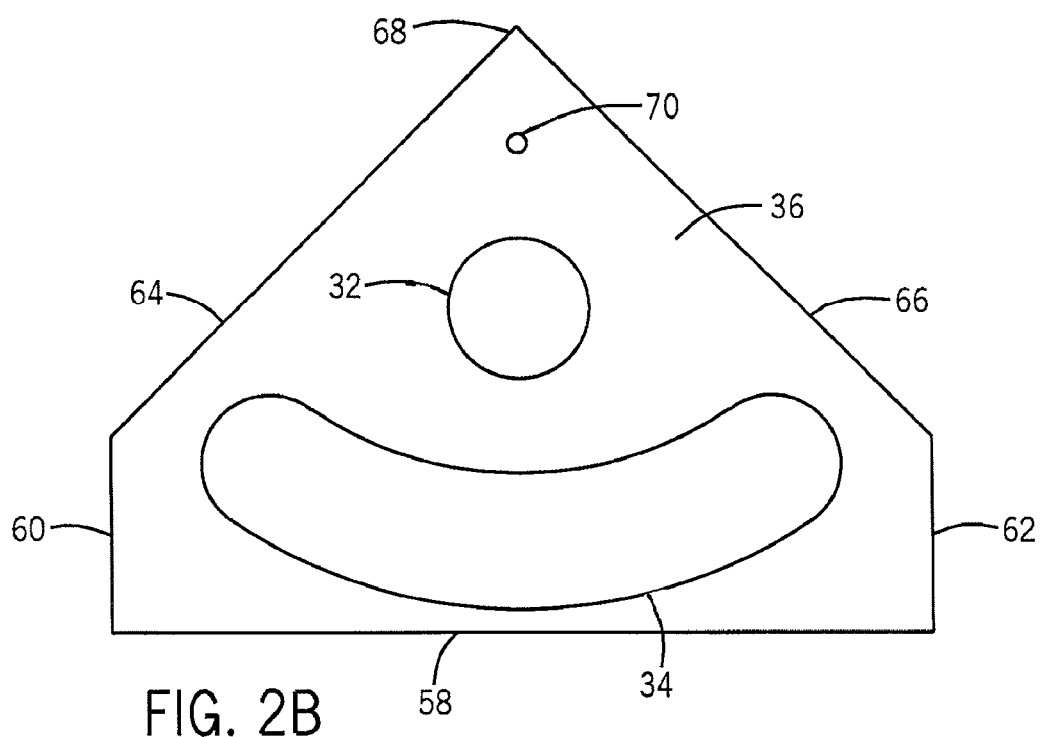
FIG. 2B is a drawing illustrating a front view of the housing of the cat toy of FIG. 1.

FIG. 1 illustrates a first preferred embodiment of an animal entertainment device or toy such as cat toy 20. Cat toy 20 includes a housing 22 configured to support a moveable pendulum shaft 24 having a first cat plaything 26, second cat plaything 28 and third cat plaything 30 attached thereto. Housing 22 preferably includes plaything openings 32 and 34 formed in its front side 36 and preferably also formed in its back side 38 and configured to provide cat viewing along with, at least in some instances, access to at least one of the playthings 26 and 28 located within the housing 22. With additional reference to FIGS. 2A and 3, the housing 22 preferably also includes a plaything viewing or access opening 40a formed in each sidewall 42 and 44 and plaything viewing or access openings 40b-c formed in each one of a pair of converging top panels 46 and 48. The housing 22 includes a generally rectangular base 50 upon which the sidewalls 42 and 44, the front side 36, the back side 38 and the top panels 46 and 48 rest.

FIGS. 2A-C and FIG. 3 better illustrate additional features of the housing 22. In the illustrated embodiment, the assembled components of housing 22 define a generally hollow pentagonal structure defining a pendulum oscillation clearance enclosure 52 within. The enclosure 52 allows for the free oscillating or swinging movement of the pendulum shaft 24 within the housing 22. It should be appreciated that the housing 22 could take on a wide variety of other geometric shapes and the pentagonal design should not be considered limiting. For example, the housing could alternatively be rectangular, triangular, or trapezoidal.

Figure 3:
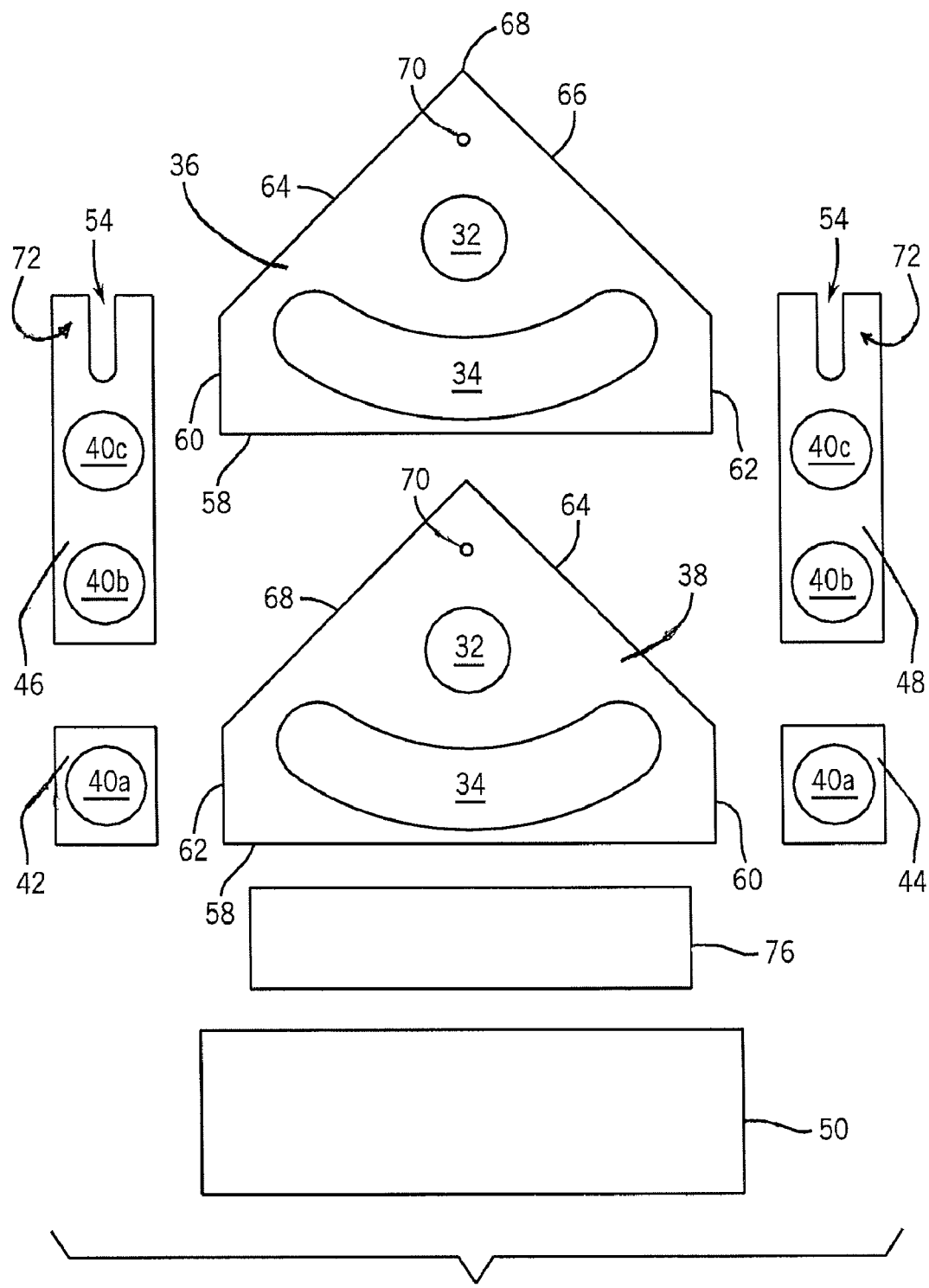
FIG. 3 is a drawing of the component parts of the disassembled housing of the cat toy of FIG. 1.

As illustrated in FIG. 3, housing 22 includes generally symmetrical front and back panels 36 and 38, generally symmetrical sidewall panels 42 and 44, and generally symmetrical top wall panels 46 and 48. In addition to openings 32 and 34 and openings 40a-c, housing 22 further may include a toy shaft clearance slot 54 that permits the top plaything 26 to move in concert with the pendulum shaft 24. In the preferred embodiment shown in the drawing figures, the housing 22 includes such a slot 54 that is centrally located such that part of the slot 54 is formed in each top panel 46 and 48 at or adjacent where the two panels 46 and 48 adjoin. Slot 54 permits oscillatory movement of a top plaything shaft 56 that is coupled or otherwise connected to the pendulum shaft 24 such that the shafts 24 and 56 oscillate at least substantially in unison. Located adjacent and below the slot 54 is a pivot 55 to which the pendulum shaft 24 is anchored. As is shown in FIG. 1, the pivot 55 includes an anchor fastener 57 that may be a wood screw or the like that retains the pendulum shaft 24 in the housing 22 in a manner that also permits it to pivot or oscillate about an axis extending through the screw 57.

In the illustrated embodiment, the housing components are constructed of a varnished MDF board. A wide variety of other materials could be utilized, including but not limited to: synthetic resins, such as ABS, vinyl chloride; PE (polyethylene); PP (polypropylene) and PET (polyethylene terephthalate). If desired, at least a few of the components may be made of metal such as sheet steel, aluminum or an alloy thereof. The components of the housing 22 are preferably secured together using glue or another adhesive. If desired, components may be secured together in some other way. For example, fasteners, welding, other bonding agents, and the like can be used. Some suitable fastener examples include hook and loop fasteners, screws, e.g., wood screws, nails, and tacks.

As illustrated in FIG. 3, housing 22 includes symmetrical front and back panels or plates 36 and 38 that preferably are at least substantially identical. In the preferred embodiment shown in the drawings, front and back panels 36 and 38 are pentagonal with each panel including a lower edge 58, a pair of generally parallel side edges 60 and 62 and a pair of converging side edges 64 and 66 that form an apex 68 side edges 64 meet. The middle plaything access opening 32 is located below a pivot receiving bore 70 and located so as to overlie the middle plaything 28 when the pendulum shaft 24 is not moving. This generally circular opening 32 is located above a curved elongate bottom pendulum plaything access window 34.

The pendulum plaything access window 34 of this embodiment is curved so as to at least generally match the track which the bottom cat plaything 30 follows during pendulum oscillation or swinging. The curved shape of the access window 34 is configured to generally correspond to the curved path of travel of the bottom-most plaything 30 on the pendulum shaft 24 and provide access by a cat to the plaything 30.

As a result of the window 34 being long and curved in this manner, a cat seeking to capture the plaything 30 in the window 34 can stick a paw through the window 34 to contact and, if desired, even detach the plaything 30 from the pendulum shaft 24, in an instance where the plaything 30 is detachably attached to the shaft 24. In the preferred embodiment shown in FIG. 1, the bottom plaything 30 is detachably attached to the shaft 24.

Sidewall panels 42 and 44 are generally rectangular pieces, e.g., square, and configured to align with and fit between the side edges 60 and 62 of front and back panels 36 and 38. These panels 42 and 44 each include tertiary cat plaything viewing openings, namely circular openings 40a. Extending between the converging side edges 64 and 66 of front and back panels 36 and 38 are a pair of symmetrical rectangular top panels 46 and 48 that converge toward one another when the housing 22 is assembled. The top panels 46 and 48 are configured to align with and fit between side edges 64 and 66 of front and back panels 36 and 38. Panels 46 and 48 each include a pair of tertiary access openings, namely circular access openings 40b and 40c. One end of each one of the top panels 46 and 48 has a U-shaped forked end 72 that defines a notch 74 that forms part of the plaything shaft clearance slot 54 (FIG. 1) when the panels are assembled to the housing. These notches 74 in panels 46 and 48 define the slot 54 (FIG. 1), which is configured to allow oscillating movement of the top plaything 26 that is attached to the moveable pendulum shaft 24.

Figure 2C:
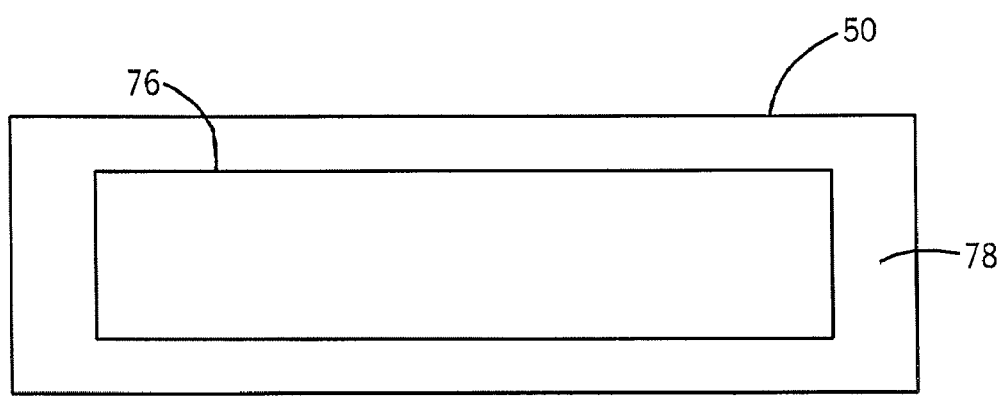
FIG. 2C is a drawing illustrating the base plate of the housing of the cat toy of FIG. 1.

Once the components of the housing 22 are assembled, the housing 22 is mounted to rectangular base plate 50. As illustrated in FIG. 2C, the area of base plate 50 is preferably larger than the rectangular area defined by the bottom of assembled housing 22 to prevent tipping of the toy 20 during use by an animal, such as a cat. In the illustrated embodiment, base plate 50 includes a secondary base plate 76 mounted thereto. Secondary base plate 76 is configured to fit snugly within the rectangular area defined by the bottom of housing 22 to add structural rigidity to the toy 20 and further inhibit tipping of the toy 20. In addition, it enables the rest of the housing 22, namely the bottom edges of panels 36, 38, 42 and 44, to engage the base plates 50 and 76 because a portion of the bottom base plate 50 extends outwardly of the top base plate 76 defining a housing seat 78.

Figure 4:
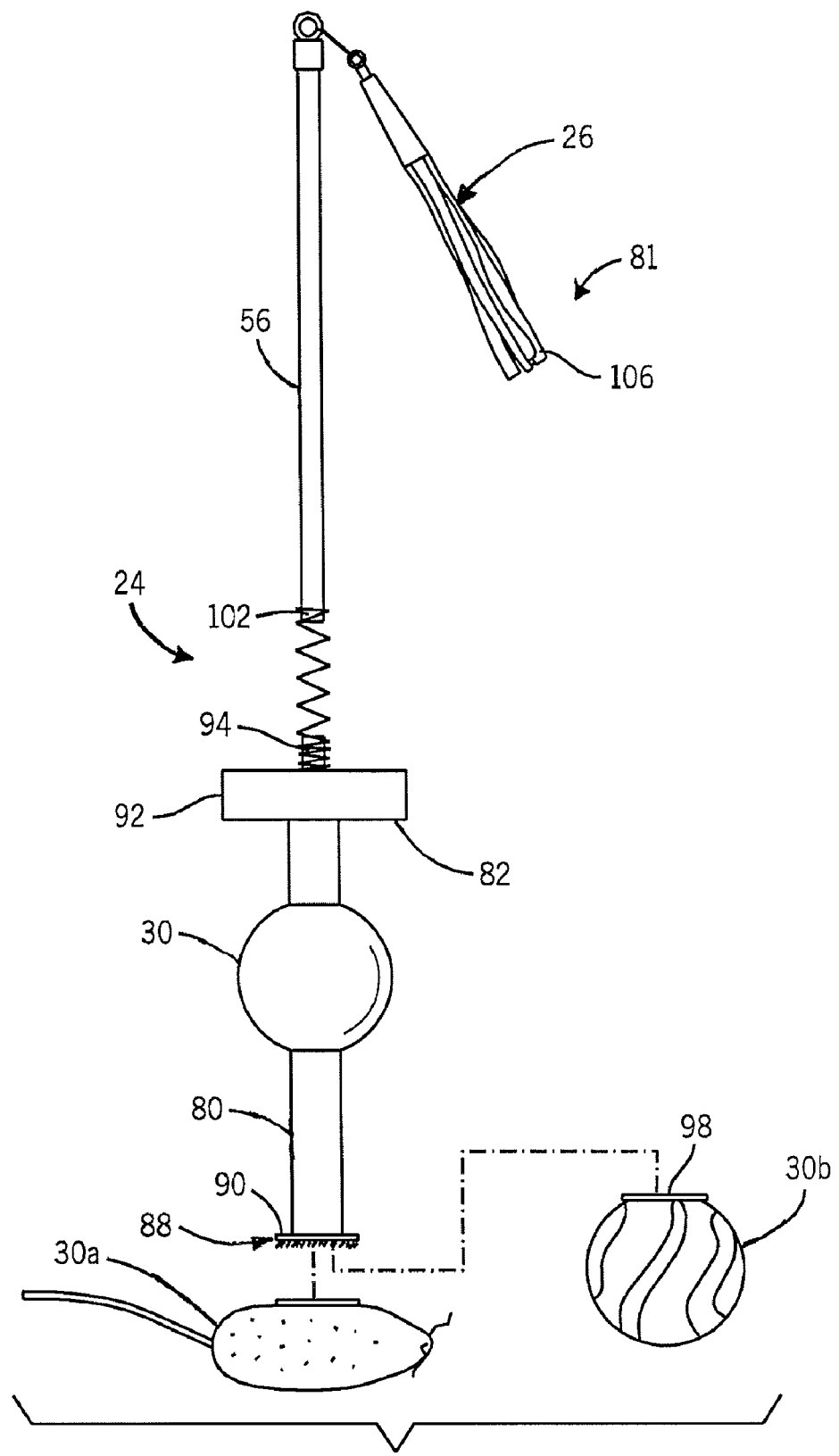
FIG. 4 is a drawing of the pendulum with attached toys of the cat toy of FIG. 1.

FIG. 4 better illustrates features of the pendulum shaft 24 and a modular cat toy cartridge or assembly 81. Pendulum shaft 24 includes a vertical rod 80 and a cross beam, fulcrum or pivot shaft 82 perpendicularly oriented at the top end 84 of the rod 80. Adjacent the bottom end 86 of vertical rod 80 is an attachment seat 88 for enabling releasable attachment of one of a plurality of different playthings 30a and 30b to the pendulum shaft 24. In the illustrated embodiment, the plaything attachment seat 88 includes a hook and loop fastener strip 90 on its lower end for releasably attaching the second plaything 30 to the pendulum shaft 24. It is understood that other attachment devices could be utilized, such as snaps and other releasable attachment known in the art.

Each end of the cross beam or pivot shaft 82 can include a pre-formed anchor hole 92 formed in it for receiving the pivot fastener 57, such as a screw (FIG. 1). In the illustrated embodiment, a pair of wood screws 57 is inserted through pivot bores 70 in the front and back panels 36 and 38 of housing 22 and into the anchor holes 92 in pivot shaft 82. Screws 57 freely rotate within the pivot bores 70, thereby allowing for the oscillating or swinging movement of the pendulum shaft 24.

Figure 5:
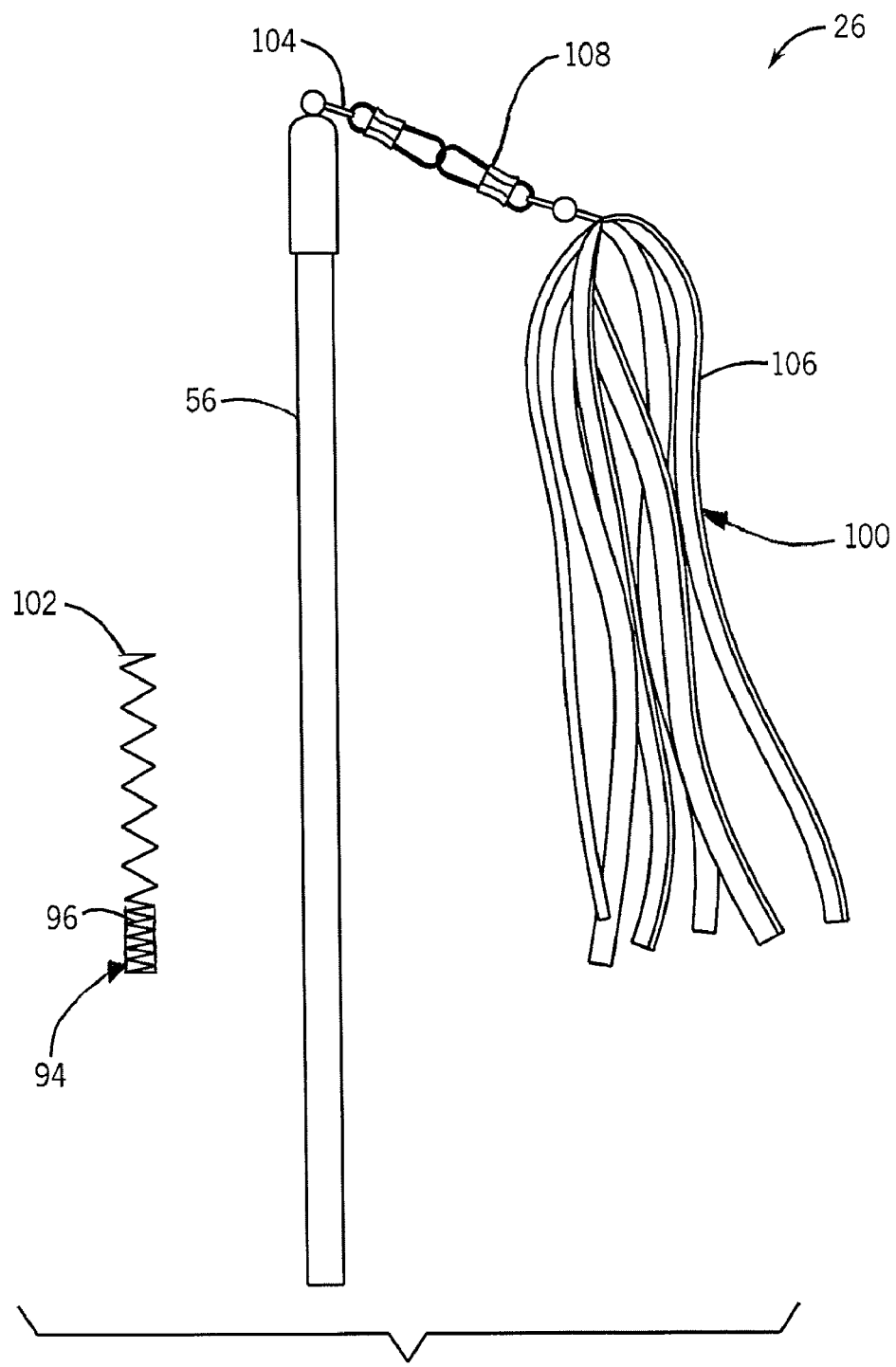
FIG. 5 is a drawing of the third cat toy.
Figure 6:
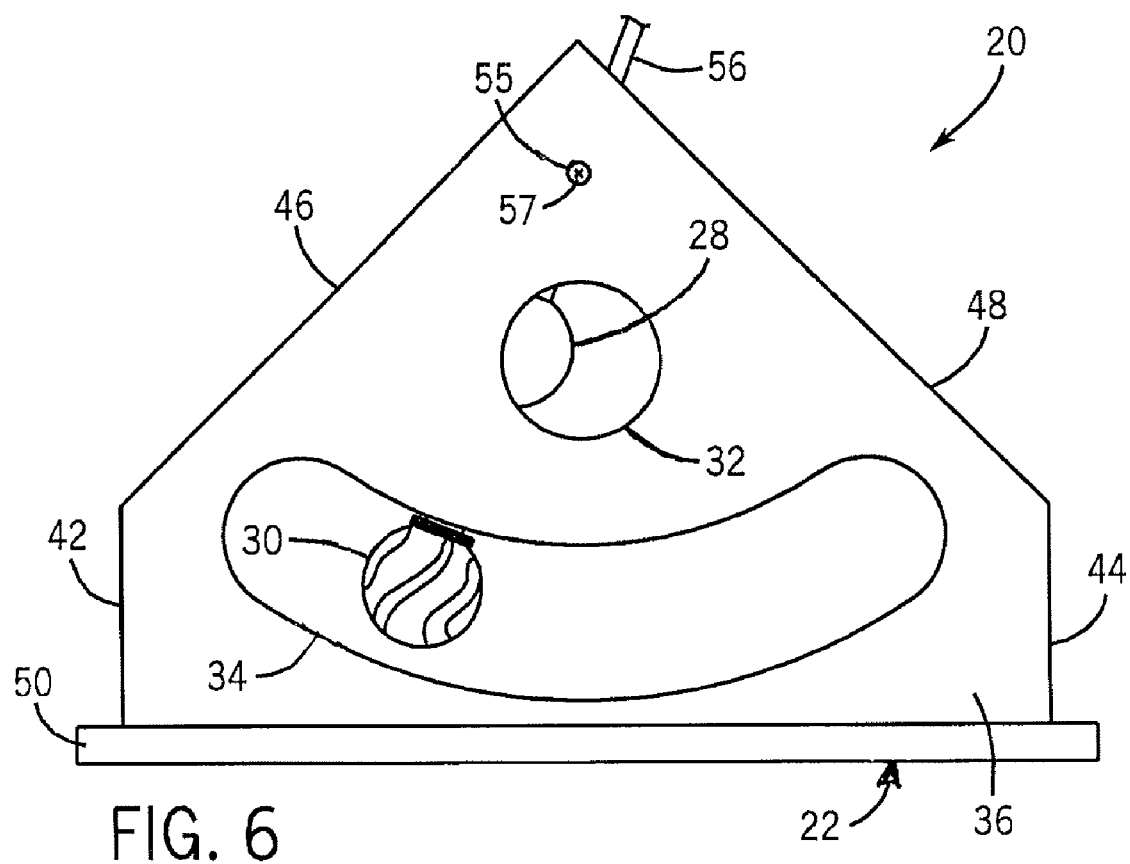
FIG. 6 is a drawing of the cat toy of FIG. 1 showing the pendulum in motion.

A top plaything mount 94 is attached to the pivot shaft 82 adjacent the top or upper end of the pivot rod 80 for releasably securing the top plaything 26 to the pendulum shaft 24. As shown in FIG. 5, in the illustrated embodiment, plaything mount 94 is a threaded stem 96 threaded into an outer surface of the shaft 82. It preferably is threaded into an internal bore in the pivot shaft 82. Part of the stem 96 projects outwardly in line with the pivot rod 80 and can be generally coaxial with a central longitudinal axis of the rod 80.

Referring back to FIG. 4, the middle plaything 28 is attached near the upper end of the vertical pendulum rod 80, and one of a plurality of bottom playthings 30a or 30b is releasably attached at or near the lower end of rod 80. If desired, the playthings 28 and 30a/30b can take a variety of forms. In the illustrated embodiment, the middle plaything 28 is a ball that can be rotatively carried by the rod 80 of the pendulum shaft 24. In one preferred arrangement, one of the bottom playthings 30a is a mouse that is releasably attached to the pendulum shaft 24. Another one of the playthings 30b is a round ball. Other plaything shapes and configurations can also be used, if desired.

Preferably, each detachable plaything 30a and 30b includes a patch or strip of hook and loop fastener material 98 for releasably attaching it to a complementary strip of hook and loop fastening material 90 attached to the end of the pendulum shaft rod 80. Depending on the type of material of the outer surface of the plaything, a separate patch or strip may not be needed where the outer surface material inherently releasably engages the attachment seat 88 of hook and loop fastening material 90. Because bottom plaything 30a or 30b is releasably attached, it enhances the enjoyment of the cat (not shown) on multiple levels. On one hand, the releaseably attached second plaything 30a or 30b provides a "goal" for the cat to remove or capture. In addition, the ability to releasably attach one of a plurality of bottom playthings 30a or 30b also allows the owner to add variety by alternating which plaything 30a or 30b the owner chooses to attach.

With additional reference to FIG. 5, top plaything 26 is mounted to pivot shaft 82 and extends upward through the slot 54 (FIG. 1) in the housing 22. In the illustrated embodiment, top plaything 26 is a leather strip toy 100 mounted by a spring 102 to the mount 94 projecting outwardly from pivot shaft 82. The spring 102 connects top plaything shaft 56 of plaything 26 via the spring 102 to the mount 94. Although not shown in the drawings, a tubular sleeve or other type of anchor arrangement encircles part of the shaft 56 and spring 102 to help keep the spring 102 more securely attached to the shaft 56, and another sleeve or the like is also employed to help keep the spring 102 more securely attached to the mount 94. The shaft 56 preferably includes a ring 104 at its upper end for attachment of a variety of different toys. Although not shown, another sleeve or the like telescopes over part of the shaft 56 and ring 104 to help prevent disengagement of the ring 104 from the shaft 56. In the illustrated embodiment, the leather strip toy 100 has a plurality of pairs of leather strips or tassles 106 is connected to the ring 104 by at least one clip 108. This ring 104 and clip 108 configuration permits other arrangements of tassels 106 or other non-tassel toys (not shown) to be attached to the upper plaything shaft 56, thereby also advantageously adding additional variety to the toy 20.

As it can be appreciated from the drawings and description, the cat toy 20 provides numerous advantages over previously-known cat toys. The cat toy 20 provides multiple moving targets to excite the predatory instincts within felines. In addition, the multiple toys provide variety and allow the device to be enjoyed by more than one cat at the same time. The unique design of the cat toy 20 allows engagement or movement of one attractant or plaything on the pendulum shaft 24 to be transferred to another plaything mounted on the shaft thereby increasing the stimulus experienced by a cat playing with one or more of playthings 26, 28 and/or 30 (e.g., 30a and/or 30b) of the toy 20. In addition, the design of pendulum shaft 24 provides for the attachment and removal of alternative playthings.

It is also to be understood that, although the foregoing description and drawings describe and illustrate in detail one or more preferred embodiments of the present invention, to those skilled in the art to which the present invention relates the present disclosure will suggest many modifications and constructions as well as widely differing embodiments and applications without thereby departing from the spirit and scope of the invention.

We claim:

1. An animal toy comprising:
   (a) a housing having a top wall having a pendulum clearance slot and a generally upwardly extending sidewall with an elongate animal access slot formed in the sidewall;
   (b) a moveable free swinging pendulum carried by the housing having a portion extending through the pendulum clearance slot outwardly of the housing and comprising a first animal attractant disposed within the housing and a second animal attractant disposed outside the housing with the pendulum clearance slot enabling pendulum movement;
   wherein the animal access slot is large enough to permit (i) insertion of a paw of an animal therethrough and (ii) engagement of the first animal attractant by the animal, the animal access slot having a longitudinal extent overlying and extending along at least a portion of a path of travel of the first animal attractant.

2. The animal toy of claim 1, wherein the pendulum comprises a first shaft that carries the first animal attractant and that is pivotally attached to the sidewall of the housing.

3. The animal toy of claim 2, wherein the pendulum comprises a second shaft resiliently coupled to the first shaft, the second shaft carrying the second animal attractant.

4. The animal toy of claim 3, wherein the first shaft is resiliently coupled to the second shaft by a coil spring.

5. The animal toy of claim 1, wherein the first animal attractant comprises an animal plaything releasably attached to the pendulum.

6. The animal toy of claim 5, wherein the first animal attractant is releasably attached to the pendulum by a hook and loop fastener arrangement in a manner that enables the animal to disengage the first animal attractant from the pendulum.

7. The animal toy of claim 5, wherein the first animal attractant comprises a ball.

8. The animal toy of claim 5, wherein the first animal attractant comprises a stuffed animal.

9. The animal toy of claim 1, wherein the second animal attractant comprises a tassel.

10. The animal toy of claim 1, wherein the animal access slot is curved along its longitudinal extent with its longitudinal extent extending substantially the entire path of travel of the first animal attractant.

11. The animal toy of claim 1, further comprising a third animal attractant carried by the pendulum that is disposed within the housing and wherein the sidewall has an opening above the animal access slot that overlies the third animal attractant when the pendulum is disposed in a generally vertical orientation.

12. A cat toy comprising:
    (a) a housing having a generally upwardly extending wall with a cat paw access opening formed therein;
    (b) a free swinging pendulum comprising an elongate shaft pivotally carried by the housing and comprising a portion extending outwardly of the housing;
    (c) a cat toy within the housing that is carried by the pendulum and movable in unison with the shaft with the cat toy accessible by a cat through the cat paw access opening;
    wherein the cat paw access opening extends along a portion of the path of travel of the cat toy; and
    wherein movement of the portion of the pendulum that extends outwardly of the housing moves the cat toy within the housing.

13. The cat toy of claim 12 wherein the cat toy comprises one of a mouse and a ball and wherein the cat toy is releasably secured to a lower end of the shaft of the pendulum using a hook and loop fastener arrangement.

14. The cat toy of claim 12 further comprising another cat toy disposed exteriorly of the housing and that is operatively connected to the pendulum.

15. The cat toy of claim 12 wherein the pendulum portion extending outwardly of the housing comprises another elongate shaft extending outwardly from the housing.

16. The cat toy of claim 15 wherein the one shaft is resiliently coupled to another shaft.

17. The cat toy of claim 16 wherein the one shaft is resiliently coupled to the another shaft by a spring.

18. A cat toy comprising:
    (a) a housing having an access opening sized large enough for a paw of a cat to reach through and into the housing;
    (b) a pendulum comprised of a pendulum shaft extending from a pivot carried by the housing where the pendulum has a back and forth path of travel;
    (c) a plurality of cat attractants or cat playthings in operable cooperation with the pendulum for movement along a back and forth path of travel substantially in unison with movement of the pendulum with one of the cat attractants or cat playthings disposed outside of the housing and another one of the cat attractants or cat playthings accessible by a paw of the cat via the housing access opening during at least a portion of pendulum movement;
    wherein the one of the cat attractants or cat playthings disposed outside of the housing is carried by an exteriorly extending shaft coupled to the pendulum shaft; and
    wherein the housing is comprised of a plurality of generally upwardly extending panels with the access opening formed in one of the panels and another access opening formed in the other one the panels, and wherein each access opening comprises an elongate opening that is curved along a direction of at least a portion of a path of travel of the another one of the cat attractants or cat playthings.

19. The cat toy of claim 18 wherein the pendulum is free swinging, and wherein the other one of the cat attractants or cat playthings is removably attached to the pendulum shaft.

20. The cat toy of claim 19 wherein the other one of the cat attractants or cat playthings comprises one of a mouse and a ball.

21. A cat toy comprising:
    (a) a housing comprised of a plurality of generally upstanding panels that each have an elongate and curved access opening sized large enough for a paw of a cat to fit through;
    (b) a free-swinging pendulum disposed within the housing that moves along a back and forth path of travel;

(c) a first cat toy disposed exteriorly of the housing and that is in operable cooperation with the pendulum for back and forth movement substantially in unison therewith; and (d) a second cat toy disposed within the housing carried by the pendulum for movement substantially in unison therewith with the second cat toy accessible through the elongate and curved access opening by a paw of the cat during movement of the pendulum.

22. The cat toy of claim 21 wherein the second cat toy remains disposed within the housing during back and forth movement of the second cat toy in response to pendulum movement and further comprising a shaft coupled to the pendulum that carries the first cat toy.

23. The cat toy of claim 21 wherein the second cat toy remains disposed within the housing during back and forth movement of the second cat toy in response to pendulum movement and further comprising a shaft coupled to the pendulum that carries the first cat toy.

24. An animal toy comprising:
(a) a housing comprised of a wall having an opening formed therein and a top wall having a pendulum movement slot formed therein;
(b) a pendulum having one portion disposed within the housing and another portion exteriorly disposed, the pendulum comprised of a first shaft coupled to a second shaft by a resilient element;
(c) at least one animal attractant or plaything carried by the pendulum;
wherein movement of the exteriorly disposed pendulum portion moves the at least one animal attractant or plaything; and
wherein the part of the pendulum extending through the pendulum movement slot in the top wall provides the exteriorly disposed pendulum portion.

25. The animal toy of claim 24, wherein the exteriorly disposed portion of the pendulum comprises one of the first and second shafts with at least a portion of the one of the first and second shafts extending outwardly of the housing.

26. The animal toy of claim 25, wherein the resilient element comprises a spring.

27. The animal toy of claim 25, wherein the at least one animal attractant or plaything is attached to the first shaft and disposed within the housing.

28. The animal toy of claim 27, further comprising at least one other animal attractant or plaything attached to the second shaft and exteriorly disposed outside the housing.

29. The animal toy of claim 28, wherein the at least one other animal attractant or plaything comprises a tassel.

30. The animal toy of claim 24, wherein the at least one animal attractant or plaything is attached to the shaft, and wherein the opening formed in the wall comprises an animal access opening that is large enough for a paw of an animal to reach through the animal access opening and engage the at least one animal attractant or plaything.

31. The animal toy of claim 30, wherein the access opening comprises an elongate curved slot that overlies and extends along substantially the entire path of travel of the at least one animal attractant or playing.

* * * * *

UNITED STATES PATENT AND TRADEMARK OFFICE
CERTIFICATE OF CORRECTION

| | | |
|---|---|---|
| PATENT NO. | : 7,900,584 B2 | Page 1 of 1 |
| APPLICATION NO. | : 11/765661 | |
| DATED | : March 8, 2011 | |
| INVENTOR(S) | : Stanley L. Suring et al. | |

It is certified that error appears in the above-identified patent and that said Letters Patent is hereby corrected as shown below:

ON THE TITLE PAGE

Item (73) Assignee:

Please correct the Assignee to read:

-- Pioneer Pet Products, LLC, Cedarburg, WI (US) --

Signed and Sealed this
Nineteenth Day of July, 2011

David J. Kappos
*Director of the United States Patent and Trademark Office*